United States Patent
Topsøe

[11] Patent Number: 5,884,474
[45] Date of Patent: Mar. 23, 1999

[54] METHOD AND CATALYST UNIT FOR TREATING DIESEL ENGINE EXHAUST

[75] Inventor: Haldor Frederik Axel Topsøe, Vedbæk, Denmark

[73] Assignee: Haldor Topsoe A/S, Lyngby, Denmark

[21] Appl. No.: 701,312

[22] Filed: Aug. 21, 1996

Related U.S. Application Data

[60] Provisional application No. 60/003,037, Aug. 30, 1995.

[51] Int. Cl.$^6$ .............................. F01N 3/28; B01D 53/94
[52] U.S. Cl. ................................ 60/274; 60/296; 60/297; 60/311; 422/171; 423/213.2
[58] Field of Search .......................... 60/274, 295, 296, 60/297, 311; 422/171, 175; 423/213.2, 213.5

[56] References Cited

U.S. PATENT DOCUMENTS

| | | | |
|---|---|---|---|
| 2,946,651 | 7/1960 | Houdry | 60/296 |
| 3,755,204 | 8/1973 | Sergeys | 502/241 |
| 3,874,854 | 4/1975 | Hunter, Jr. | 422/175 |
| 4,455,393 | 6/1984 | Domesle et al. | 502/347 |
| 4,477,417 | 10/1984 | Domesle et al. | 60/311 X |
| 4,510,265 | 4/1985 | Hartwig | 502/330 |
| 4,515,758 | 5/1985 | Domesle et al. | 423/213.2 |
| 4,759,918 | 7/1988 | Homeier et al. | 423/213.5 |
| 4,900,517 | 2/1990 | Domesle et al. | 60/301 X |
| 5,087,430 | 2/1992 | Hanada et al. | 423/239.1 |

FOREIGN PATENT DOCUMENTS

| | | |
|---|---|---|
| 0574611 | 6/1996 | European Pat. Off. . |
| 3043995 | 6/1981 | Germany . |
| 4435618 | 4/1996 | Germany . |

*Primary Examiner*—Tony M. Argenbright
*Attorney, Agent, or Firm*—Ostrolenk, Faber, Gerb & Soffen, LLP

[57] ABSTRACT

A method for the removal of particulate matter contained in exhaust gas from a diesel fuelled engine. The exhaust gas stream is passed over a carrier having supported thereon one or more inorganic compounds which are in the form of a melt or subcooled melt, the particulate matter in the exhaust gas stream on the melt and/or subcooled melt is adsorbed, the combustibles in the adsorbed particulate matter are burned off, and an exhaust gas stream substantially free of particulate matter is withdrawn.

11 Claims, 1 Drawing Sheet

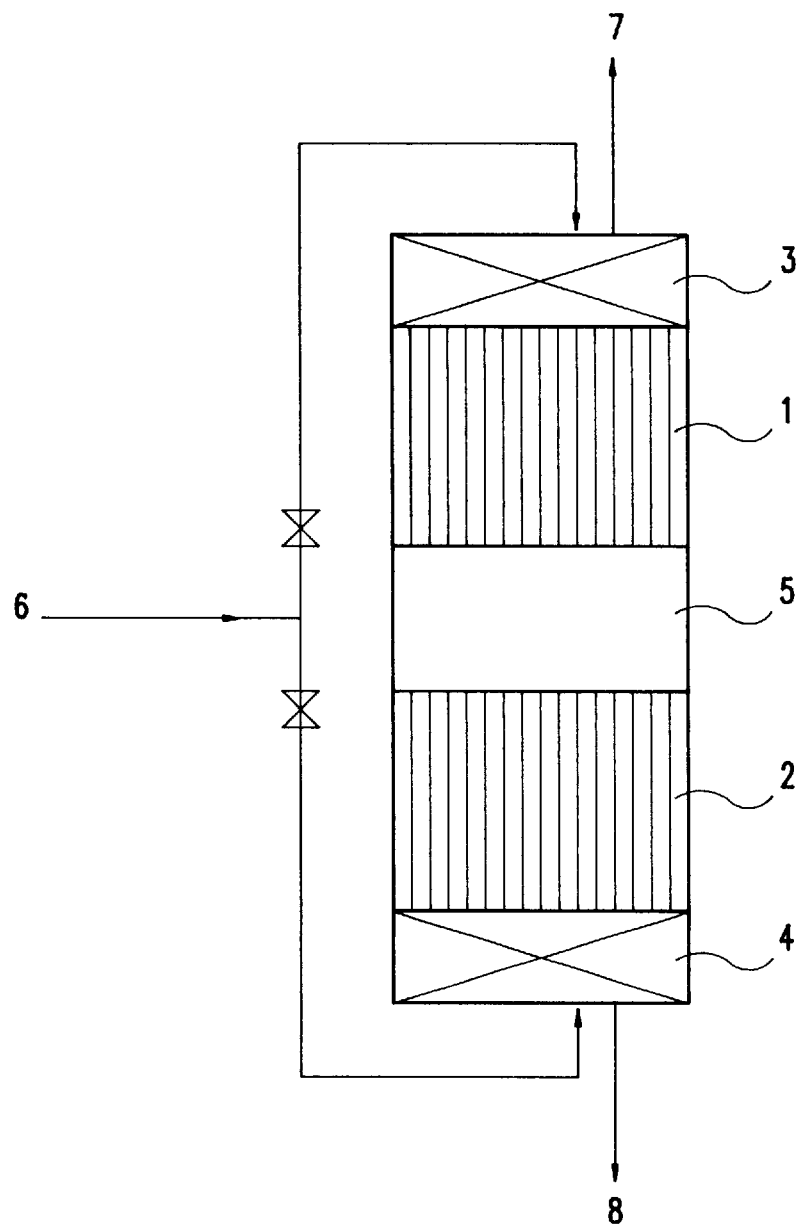

METHOD AND CATALYST UNIT FOR TREATING DIESEL ENGINE EXHAUST

This application claims the benfit of U.S. Provisional application No. 60/003,037, filed Aug. 30, 1995.

The present invention is directed to the treatment of diesel exhaust. More particular, the invention provides a method and assembly for the removal of noxious compounds being generated during operation of a diesel engine.

Exhaust from diesel engines contains beside gaseous emission contaminants particulate matters from inorganic compounds in diesel fuel together with soot particles being formed during operation of the engines.

Particulate matter in the exhaust, and especially soot, is rich in harmful polynuclear organic compounds. Thus, for reasons of health and environment, it is required to remove at least soot from the exhaust.

In the past, various attempts have been made to provide methods, which reduce soot concentration in diesel exhaust to environmental acceptable levels.

Those methods are generally based on filtration of exhaust. Filters, recently suggested in the art, are in form of monolithic structured bodies with a plurality of straight line channels confined by porous walls. The channels are alternatingly open and closed at the inlet and outlet face of the filter in such a way that channels being open at the inlet face are closed at the outlet face. Exhaust gas being introduced into the filter is, thereby, forced through the porous walls into open ended outlet channels and soot in the exhaust is captioned on the walls as further described in DE 3,043,995 A1, EP 87,067 and JP 63-282,515.

At average operational condition of diesel engines, the temperature in the exhaust is not sufficiently high to burn off captioned soot particles and the particles clog the pore in the filter walls after a certain time on stream. Regeneration of the filters is carried out by periodical heating to the ignition temperature of deposited matter, either in situ or heat treatment of dismounted filters in an oven. As a drawback of the known wall flow filters, regeneration is energy consuming by the necessary application of external heat and requires usually disruption of the normal operation mode of the engine during regeneration or replacement of spent filters.

Continuous burning off soot particles captioned on walls of filters of the above type by catalytical substances being active in reducing the ignition temperature of diesel soot filtered out of the exhaust is mentioned in U.S. Pat. No. 4,515,758.

Even the catalyzed wall flow filters allow regeneration at lower temperatures, a disadvantage of the filters is similar to the previous monolithic filter high pressure drop caused by passage of exhaust through porous walls of the filter, which reduces the efficiency of the diesel engine.

A general object of this invention is to provide a method and a catalyst unit for the removal of particulate matter typically in the form of soot from diesel exhaust without the drawbacks and disadvantages of the known filters.

It has been observed that catalytic combustion rate of combustible particulate matter on surfaces depends on the efficiency of the surface to make contact with particles. The contact efficiency is related to the capacity of the surface to wet deposited particles. High wetting capacities, and thus improved catalytic efficiency in the combustion of combustible material contained in diesel exhaust, are obtained on surfaces with catalytic active materials having a melting point at approximately the same temperature as the temperature of the gas during contact with the surface.

Pursuant to the above observations, the method of this invention is a method for the removal of particular matter contained in exhaust gas from a diesel fueled engine comprising passing the exhaust gas stream over a surface having adsorbed thereon one or more inorganic compounds, which are in the form of a melt or a subcooled melt during contact with the exhaust gas stream;

adsorbing the particulate matter in the exhaust gas stream on the melt and/or the subcooled melt of the inorganic compounds; and burning off combustibles in the adsorbed particulate matter, thereby obtaining an exhaust gas stream being substantially free of particulate matter and combustibles.

At usual operational conditions, the exhaust gas temperature of a diesel engine is for the most part of the operation time below 400° C., whereas the ignition temperature of soot, the main particulate component in diesel exhaust is above 500° C.

Thus, in order to provide the necessary contact efficiency at usual operation of the diesel engine, the inorganic compounds must have a melting point not higher than about 500° C., preferably not higher than about 400° C.

It is further important that soot deposed on the inorganic melt or subcooled melt is burnt off continuously within the normal temperature interval of the diesel exhaust in order to avoid clogging of the adsorbing surface.

Preferred inorganic compounds for use in the invention are those having a melting point in the range of 300°–500° C. and being catalytic active in the burning of soot.

Compounds being usually employed in the catalyzed burning of soot are oxides of vanadium, tungsten, copper, mangan, cobolt, molybdenum, silver and chromium. However, the above metal oxides have a melting point, which is much higher than the exhaust gas temperature at normal operation of the diesel engine.

The melting point may be lowered by introducing defects in the metal oxide lattice. Furthermore, sulphates and, in particular, pyrosulphates of some of the above metals have a melting point, which is sufficiently low for use in the invention.

Eutectic compositions, having a melting point within the required range, include one or more of the above catalytic active metals and are based on mixtures comprising two or more oxides, sulphates, vanadates and/or mobates of cesium, potassium, sodium, zinc and copper $Cs_2O$. $V_2O_5$, $K_2O$. $V_2O_5$, $Na_2O$. $V_2O_5$, $CsVO_3$. $NaVO_3$ . $KVO_3$ and $K_2SO_4$. $Na_2SO_4$ . $ZnSO_4/CUSO_4$, $KCuNbO_4$ and mixtures thereof.

When used as catalyst in the burning of soot, the above compositions will typically be supported by conventional procedures on a porous carrier of alumina, titania, magnesia, silica, zirconia or mixtures thereof in form of particles, fibres or geometrical bodies with a high surface to volume ratio to provide efficient contact with the exhaust gas.

Useful catalysts for use in the invention are in particular prepared by compressing a mineral wool carrier to a catalytic filter body and coating the above eutectic compositions on the surface of the carrier.

In the fibrous catalysts carrier two important parameters for the efficiency are the fibre diameter and the porosity of the carrier. The fibre diameters are controlled in the fibre manufacturing process while the porosity of the final diesel soot catalyst is controlled by the packing of the fibres.

One way of achieving an efficient catalyst is by using mineral wool like Rockwool batches, which are packed to a given porosity, meanwhile it is burnt at a temperature above the glass transition temperature for the fibre material. When the glass transfer temperature is reached, the fibres are sintered together creating a crosslinked pattern. The temperature and the time for sintering mineral wool is typically 700° C. for 1 to 10 h. The porosity varies then between 50% and 95% in the final product.

The fibres may further be treated with a sol, for example a silica sol, to obtain better mechanical properties by providing links between the fibres. The sol treatment results in improved adhesion of the catalytic material active in lowering the activation energy in the combustion os soot.

The catalysts may be loaded in fixed bed manner in a contact vessel.

Further useful catalyst shapes are the monolith or honeycomb type carriers with a plurality of open passages extending through the catalyst structure from an inlet to a separate outlet. Those catalysts provide a high geometric surface with a low resistance to gas flow.

Removal of particulate matter during passage of diesel exhaust through the above multichannel catalyst bodies requires turbulent gas flow in order to promote mass transport of particles to the channel walls. Turbulent or swirling flow in straight channel monolithic carriers is observed mainly past edges at the inlet section for the gas.

Thus, a monolithic or honeycomb structured catalyst unit with high efficiency in the removal of particulate matter from diesel exhaust mainly comprises at least a section with a series of subsequent monolith slices with straight channels. The slices are arranged spaced apart from each other in a housing, so that exhaust gas being introduced into the catalyst unit is transferred to a turbulent or swirling flow by impact on edges at the inlet section of each monolith slice, and particulate matter in the gas is transported to and deposited on channel walls of the slices.

The invention may further be carried out in a catalyst unit constructed as a regenerative system with a catalyst chamber being provided at its inlet end and outlet end with a regenerator in form of a packed bed of ceramic bodies or a monolithic structure being able to store heat contained in hot exhaust gas leaving the catalyst chamber. In such a unit, diesel exhaust gas is passed in alternating flow directions through the regenerators and the catalyst chamber. Cold exhaust gas is passed through a regenerator at the inlet of catalyst chamber. The gas is thereby preheated in the regenerator to a temperature allowing catalytic combustion of particulate matter in the catalyst chamber.

By combustion the gas temperature rises in the catalyst chamber, and hot cleaned exhaust gas is withdrawn from the unit through the regenerator at the outlet of the chamber. Thereby, the regenerator is heated by excess heat of the hot exhaust gas. After a certain operational time, the flow of cold exhaust gas is in a subsequent operational cycle reversed and the gas is introduced into the regenerator having been heated by hot exhaust in the previous operational cycle.

Accordingly, the invention provides furthermore a regenerative catalyst unit for use in the removal of particulate matter from diesel exhaust gas, the catalyst unit comprises at least one catalyst chamber holding a catalyst having one or more inorganic compounds supported on a porous surface, which inorganic compounds are in the form of a melt or in subcooled melt during contact with the exhaust gas and are active in the burning of particulate matter;

a regenerator at the inlet and outlet end of the catalyst chamber, the regenerator is in the form of a fixed bed with ceramic bodies with high heat storage capacity, where direction of flow of the exhaust gas is periodically reversed, so that the exhaust gas is preheated in the inlet regenerator by heat contained in hot exhaust gas being withdrawn from the catalyst chamber and being passed through the regenerator prior to reversal of the exhaust gas flow direction.

The drawing figure shows a preferred from of the invention.

In a preferred form of construction, as shown in the appended drawing, the regenerative catalyst unit is provided with two catalyst chambers 1 and 2 between the regenerators 3 and 4, and a heating chamber 5 between the catalyst chambers. The heating chamber is equipped with a heater, e.g. a burner or an electrical heater supplying heat to the exhaust gas leaving the first catalyst chamber. Exhaust gas to be treated enters the unit at inlet 6 and the treated gas leaves at outlets 7 and 8 alternately.

In either form of construction, the catalyst chambers are preferably loaded with supported catalyst particles, or monolithic catalyst bodies as previously described.

EXAMPLE 1

A eutectic composition with the formula $CsKNa_{0.1}V_{3.3}O_{9.3}$ was prepared by mixing $CS_2O$. $V_2O_5$, $K_2O$. $V_2O_5$ and $Na_2O$. $V_2O_5$ in a mole ratio of 1:1:0.1.

The melting point of the composition was determined by thermal gravimetric analysis TGA to 338° C.

2% by weight of soot were admixed to a test sample of the above composition and soot combustion measured by TGA.

Combustion start of soot was measured at 304° C. with a maximum in the combustion rate at 380° C.

EXAMPLE 2

A eutectic composition with the formula $CsK_{1.9}Na_{0.1}V_{3.3}Nb_{0.9}CU_{0.9}O_{12.9}$ prepared by admixing to the eutectic composition prepared in Example 1 mole $KCuNbO_4$ per mole of the eutectic composition has a melting point of 421° C. as measured by TGA. Soot admixed to the composition (2% by weight) burnt off at a start temperature of 259° C. with a maximum combustion rate at 320° C.

EXAMPLE 3

A Rockwool carrier was coated with an eutectic composition of the formula:

by impregnating the carrier with:

5.6 wt % Cs
2.5 wt % Cu
3.9 wt % Nb
0.8 wt % Na
8.1 wt % K
7.7 wt % V with an aqueous solution containing soluble salts of the above components.

The impregnated carrier was tested in the burning of soot from diesel exhaust.

Combustion of soot initiated at 240° C. with a maximum combustion activity at 360° C.

I claim:

1. A method for the removal of particulate matter contained in exhaust gas from a diesel fuelled engine comprising passing the exhaust gas stream over a carrier having supported thereon one or more inorganic compounds, which are in the form of at least one of a melt and subcooled melt during contact with the exhaust gas stream, said inorganic compounds being selected from eutectic compositions of $Cs_2O$. $V_2O_5$. $K_2O$. $V_2O_5$; $Na_2O$. $V_2O_5$; $CsVO_3$. $NaVO_3$. $KVO_3$; $K_2SO_4$. $Na_2SO_4$. $ZnSO_4/CuSO_4$; $KCuNbO_4$ and mixtures thereof;

absorbing the particulate matter in the exhaust gas stream on the melt or subcooled melt of the inorganic compounds;

burning off combustibles in the absorbed particulate matter, and withdrawing an exhaust gas stream being substantially free of particulate matter.

2. Method according to claim 1, wherein the inorganic compounds have a melting point less than 500° C.

3. Method according to claim 1, wherein the inorganic compounds have a melting point in the range of 300° C. to 500° C. and are catalytically active in the burning of soot.

4. Method according to claim 1, wherein the carrier consists of mineral fibres.

5. Method according to claim 1, wherein the carrier consists of a monolithic body.

6. A method as in claim 1, wherein said inorganic compound is a eutectic composition of the formula $CsKNa_{0.1}V_{3.3}O_{9.3}$.

7. A method as in claim 1, wherein said inorganic compound is a eutectic composition of the formula $CsK_{1.9}Na_{0.1}V_{3.3}Nb_{0.9}Cu_{0.9}O_{12.9}$.

8. A method as in claim 1, wherein said inorganic compound is a eutectic composition of the formula $CsK_{0.5}Na_{0.8}V_{3.6}NbCuO_{13.6}$.

9. A regenerative catalyst unit for use in the removal of particulate matter from diesel exhaust gas, said catalyst unit comprising at least one catalyst chamber holding a catalyst having supported on a porous surface thereof one or more inorganic compounds, which are in the form of a melt at least one of a melt and subcooled melt in subcooled melt during contact with the exhaust gas and are active in the burning of particulates, said inorganic compounds being selected from eutectic composition of $Cs_2O$. $V_2O_5$. $K_2O$. $V_2O_5$; $Na_2O$. $V_2O_5$. $CsVO_3$. $NaVO_3$. $KVO_3$; $K_2SO_4$. $Na_2SO_4$. $ZnSO_4/CuSO_4$; $KCuNbO_4$ and mixtures thereof; and a regenerator at the inlet and outlet end of the catalyst chamber, said regenerator being in the form of a fixed bed of ceramic bodies with the high heat storage capacity, said catalyst unit including means whereby the direction of flow of the exhaust gas is periodically reversed, so that the exhaust gas is preheated in the inlet regenerator by heat contained in hot exhaust gas being withdrawn from the catalyst chamber and having been passed through the regenerator prior to reversal of the exhaust gas flow direction.

10. Regenerative catalyst unit according to claim 9, wherein the unit is provided with two catalyst chambers between the regenerators and a heating chamber between the catalyst chambers.

11. Regenerative catalyst unit according to claim 10, wherein the heating chamber is provided with a heater.

* * * * *